(12) United States Patent
Duregger et al.

(10) Patent No.: US 11,576,304 B2
(45) Date of Patent: Feb. 14, 2023

(54) LAWN MOWER

(71) Applicant: Andreas Stihl AG & Co. KG, Waiblingen (DE)

(72) Inventors: Georg Duregger, Niederndorf (AT); Marco Scheid, Kiefersfelden (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 326 days.

(21) Appl. No.: 16/871,169

(22) Filed: May 11, 2020

(65) Prior Publication Data

US 2020/0359561 A1    Nov. 19, 2020

(30) Foreign Application Priority Data

May 17, 2019 (EP) ..................................... 19175188

(51) Int. Cl.
   *A01D 34/71*  (2006.01)
   *A01D 43/063* (2006.01)
   *A01D 101/00* (2006.01)

(52) U.S. Cl.
   CPC ........... *A01D 34/71* (2013.01); *A01D 43/063* (2013.01); *A01D 2101/00* (2013.01)

(58) Field of Classification Search
   CPC ... A01D 34/71; A01D 43/063; A01D 2101/00
   USPC ...................................................... 56/320.2
   See application file for complete search history.

(56) References Cited

U.S. PATENT DOCUMENTS

| | | | |
|---|---|---|---|
| 4,008,559 A | 2/1977 | Lessig, III et al. | |
| 5,442,902 A * | 8/1995 | Mosley | A01D 42/005 D15/17 |
| 9,661,802 B1 | 5/2017 | Seliga | |
| 2003/0182919 A1 | 10/2003 | Baumann et al. | |
| 2012/0233975 A1 | 9/2012 | Coussins | |
| 2012/0260619 A1 | 10/2012 | Haraqia et al. | |
| 2014/0109538 A1 | 4/2014 | Sugio | |
| 2017/0202140 A1 | 7/2017 | Lopez et al. | |
| 2018/0007829 A1 | 1/2018 | Lopez et al. | |
| 2018/0184590 A1 | 7/2018 | Takahashi et al. | |

FOREIGN PATENT DOCUMENTS

| | | | |
|---|---|---|---|
| CN | 103858593 A | * 6/2014 | |
| CN | 205 357 1 62 | 7/2016 | |
| CN | 107432161 A | * 12/2017 | |
| CN | 107 624 369 | 1/2018 | |
| CN | 207 099 729 | 3/2018 | |
| CN | 107846840 A | * 3/2018 | ............. A01D 34/68 |

(Continued)

Primary Examiner — Mahmoud Gimie
(74) Attorney, Agent, or Firm — Gudrun E. Huckett

(57) ABSTRACT

A lawn mower is provided with a housing that has a discharge opening for discharging cut material. A covering device is arranged at the housing and is provided with a cover and a locking device. The cover can pivot about a pivot axis. The cover covers the discharge opening in a closed state of the cover and opens the discharge opening in an open position of the cover. In the closed state of the cover, the cover can be locked by the locking device in a locked position of the cover. The cover is moveable relative to the housing in a direction of the pivot axis. The cover is unlocked from the locked position of the cover by a movement of the cover in the direction of the pivot axis.

12 Claims, 4 Drawing Sheets

(56) References Cited

FOREIGN PATENT DOCUMENTS

| CN | 207151196 U | * | 3/2018 | |
|---|---|---|---|---|
| CN | 207 1 85 224 | | 4/2018 | |
| CN | 207219444 U | * | 4/2018 | |
| CN | 207 321 963 | | 5/2018 | |
| CN | 207321963 U | * | 5/2018 | |
| CN | 207733268 U | * | 8/2018 | |
| EP | 1 584 224 | | 10/2005 | |
| EP | 3 141 098 | | 3/2017 | |
| EP | 3 329 759 | | 6/2018 | |
| JP | 2018088868 A | * | 6/2018 | ........... A01D 34/005 |
| WO | 2004/071165 | | 8/2004 | |
| WO | 2010/108511 | | 9/2010 | |

* cited by examiner

LAWN MOWER

BACKGROUND OF THE INVENTION

The invention relates to a lawn mower comprising a housing provided with a discharge opening for discharging cut material and comprising a covering device secured at the housing, wherein the covering device comprises a cover and a locking device, wherein the cover is pivotable about a pivot axis, wherein the cover covers the discharge opening in a closed state, wherein the cover releases the discharge opening in an open position, and wherein the cover can be locked by means of the locking device in the closed state.

US 2003/0182919 A1 discloses a lawn mower with a discharge opening for discharging cut material which is covered by a covering device. The covering device comprises a cover that is pivotably supported about a pivot axis. In a closed state, the cover covers the discharge opening and can be locked by means of a locking device. For unlocking, a latch that is supported in the cover must be displaced in a direction transverse to the pivot axis. In doing so, first the latch is moved relative to the cover in order to unlock the cover and then the cover is pivoted relative to the housing of the lawn mower. The covering device comprises a plurality of individual parts so that the manufacture of the covering device is complex.

It is an object of the invention to further develop a lawn mower of the aforementioned kind in such a way that it can be produced in a simple way.

SUMMARY OF THE INVENTION

In accordance with the invention, this is achieved in that the cover is movable relative to the housing in the direction of the pivot axis and in that the cover can be unlocked by a movement of the cover in the direction of the pivot axis.

Accordingly, the cover can be designed such that only the cover itself must be moved for opening and unlocking the cover. The movement of a latch relative to the cover is no longer required. For unlocking and opening the cover, the cover is unlocked by a movement of the cover relative to the housing in the direction of the pivot axis and is subsequently opened by a pivot movement in a direction about the pivot axis. In this way, no latch movable relative to the cover is required for unlocking the cover. Therefore, the covering device of the lawn mower and therefore the entire lawn mower can be produced in a simple way. The covering device of the lawn mower according to the invention comprises fewer movable parts and is therefore less prone to wear. Only a minimal servicing expenditure is required.

Advantageously, the covering device comprises a restoring device that loads the cover in the open position with a force in the direction toward the closed state. In this way, it is ensured that the covering device is only open when the cover is held open. Otherwise, the cover automatically closes. In this way, it is prevented that the lawn mower can be operated with the cover being open.

Expediently, the cover, due to the force which is exerted by the restoring device, is moveable continuously from the open position into the closed state.

In an advantageous further embodiment of the invention, the covering device comprises a spring assembly.

Advantageously, the spring assembly comprises a torsion spring that is part of the restoring device. Advantageously, the torsion spring is the restoring device. In this way, the cover is loaded in the open position in a simple way by a force in the direction toward the closed state.

In an advantageous further embodiment of the invention, the spring assembly comprises an axial spring which is part of the locking device and is acting between the housing and the cover in the direction of the pivot axis. Advantageously, the axial spring acts between a base member of the covering device and the cover in the direction of the pivot axis. In this way, the covering device can be designed in a simple way such that the cover of the covering device locks automatically. This increases the safety of the lawn mower. The covering device can be designed such that, after opening the cover, the cover automatically returns into the closed state and locks automatically. In this way, operation of the lawn mower with open cover is prevented.

Advantageously, the axial spring is a pressure spring.

In an advantageous further embodiment of the invention, the spring assembly is a combined axial and torsion spring that is part of the restoring device as well as part of the locking device. In this way, components can be saved and the covering device can be produced in a simple way. This results in a simple and compact configuration. However, it can also be provided that the axial spring and the torsion spring are embodied separate from each other.

In an advantageous further embodiment of the invention, the locking device comprises a first part provided at the cover and a second part secured at the housing wherein, in the closed state of the cover, the first part and the second part of the locking device overlap each other in a locked position of the closed state in the direction of the pivot axis such that the cover is secured against pivoting about the pivot axis. In this way, the locking action of the cover in the closed state can be realized in a simple way. In this way, only a very small number of components are required for locking the cover. This enables a simple manufacture of the covering device of the lawn mower and of the lawn mower itself. Expediently, the second part of the locking device is secured at the base member and the covering device is secured by the base member at the housing of the lawn mower in such a way that the base member is non-slidable relative to the housing.

Expediently, the cover is slidable in the direction of the pivot axis relative to the second part of the locking device in such a way that the first part of the locking device and the second part of the locking device are then arranged relative to each other without overlap in the direction of the pivot axis. In this way, is simple unlocking of the cover is possible.

Advantageously, the first part of the locking device is formed together with the cover as one piece. In this way, components can be saved and the covering device can be produced in a simple way. However, a multi-part configuration of cover and locking device can be provided also.

Expediently, the second part of the locking device is formed by a locking edge which is secured at the base member. Advantageously, the locking edge is embodied together with the base member as one piece. In this way, components can be saved and the covering device can be produced in a simple way.

Advantageously, the locking edge comprises a support surface in the direction of the pivot axis and the spring assembly pretensions the cover in the open position of the cover against the support surface. In this way, the covering device can be designed such that the cover can be locked only when the cover is in the closed state. Moreover, a configuration of the cover is possible such that the cover completely automatically returns from the open position first into an unlocked position of the closed state and then automatically locks in that the cover is automatically moved into the locked position.

An embodiment of the invention will be explained in the following with the aid of the drawings.

DESCRIPTION OF THE PREFERRED EMBODIMENTS

Figure 1:
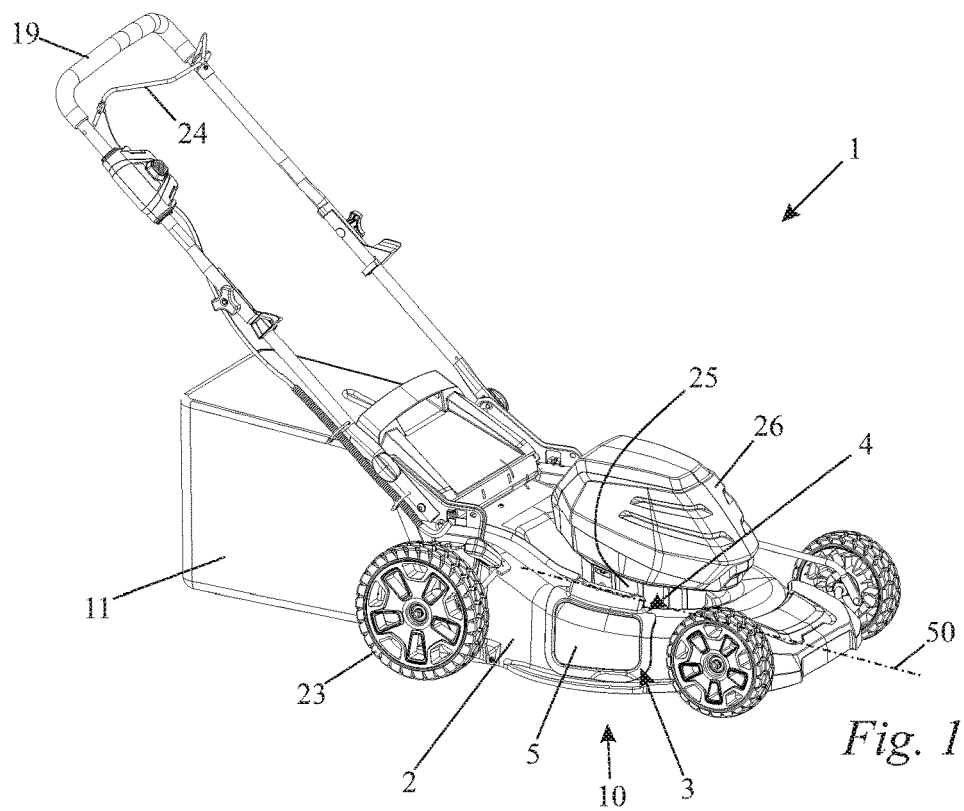
FIG. 1 is a perspective illustration of a lawn mower with a discharge opening and a covering device.

FIG. 1 shows a lawn mower 1 with a housing 2. In the embodiment, the housing 2 is embodied as a cutting deck. The housing 2 carries wheels 23 and a motor 25. The wheels 23 are supported rotatably at the housing 2. The motor 25 is an electric motor in the embodiment. However, it can also be provided that the motor is configured as an internal combustion engine. A hood 26 is arranged on the motor 25. The hood 26 covers the motor 25 at least partially. The lawn mower 1 comprises a handlebar 19 for pushing the lawn mower 1. The motor 25 drives in rotation at least one cutting blade for cutting the lawn. The motor 25 can be actuated by an actuating element 24 which is arranged at the handlebar 19. The cut material can be collected in a collecting container 11 or discharged through a discharge opening 3 or a rear discharge (not illustrated) or can be used for mulching.

The discharge opening 3 is arranged at the housing 2 of the lawn mower 1. When the cut material is to be collected in the collecting container 11, i.e., the lawn mower 1 is operated in collecting mode, the discharge opening 3 is closed. This is also the case when the cut material is discharged through the rear discharge and in case of mulching. For this purpose, the lawn mower 1 comprises a covering device 4. The covering device 4 is secured at the housing 2. The covering device 4 comprises a cover 5. In collecting mode, the cover 5 is in the closed state 10. In the closed state 10, the cover 5 closes off the discharge opening 3. The cover 5 is pivotable about a pivot axis 50. In order to be able to operate the lawn mower 1 with open cover 5 in a lateral discharge mode, the cover 5 is opened and a lateral discharge chute (not illustrated) is inserted into the discharge opening 3. The lateral discharge chute is hooked and secured at the housing 2 in the discharge opening 3. The cover 5 is then resting against the lateral discharge chute and is thereby prevented from returning from its open position 20 illustrated in FIG. 6 into its closed state 10 illustrated in FIG. 1. In the closed state 10 of the cover 5, the cover 5 covers the discharge opening 3. In its open position 20, the cover 5 at least partially opens the discharge opening 3.

Figure 2:
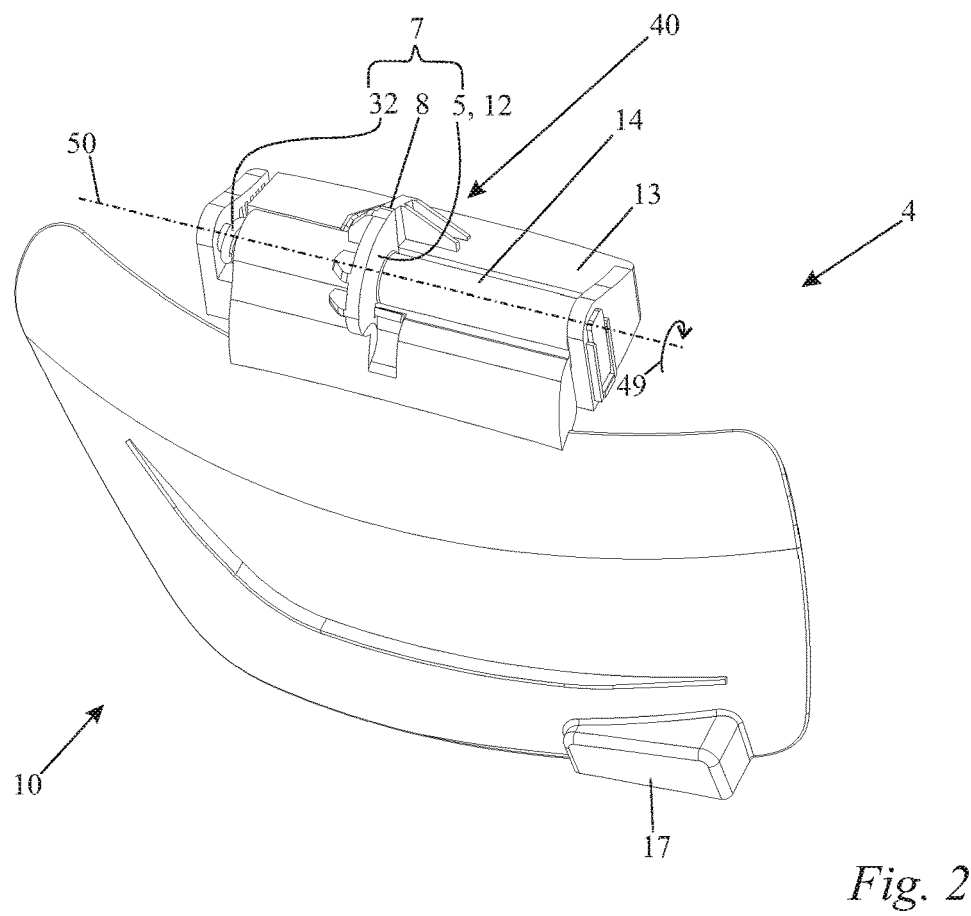
FIG. 2 is a perspective illustration of the covering device of FIG. 1 with locked cover.
Figure 3:
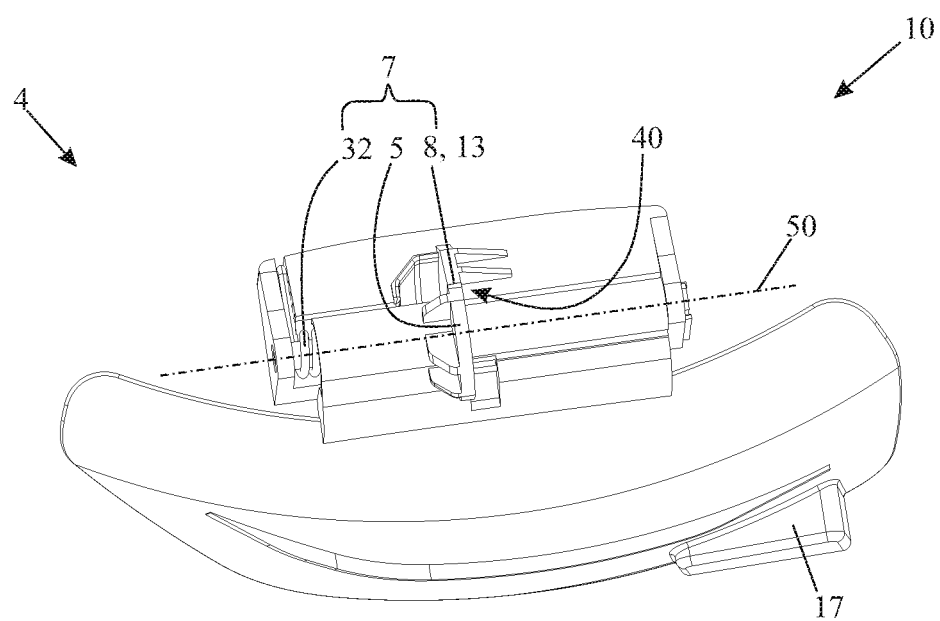
FIG. 3 is another perspective illustration of the covering device of FIG. 1 with locked cover.

FIGS. 2 and 3 show the covering device 4 in its closed state 10. The covering device 4 comprises a base member 13. The base member 13 is non-slidably secured at the housing 2 of the lawn mower 1 shown in FIG. 1. It can also be provided that the base member of the covering device is embodied together with the housing as one piece. At the base member 13 of the covering device 4 that is illustrated in FIG. 2, the cover 5 is supported to be pivotable about the pivot axis 50.

In FIG. 2, the cover 5 is illustrated in a locked position 40. In the locked position 40, the cover 5 is secured against pivoting about the pivot axis 50 in the closed state 10 of the cover 5. For this purpose, the covering device 4 comprises a locking device 7.

Figure 6:
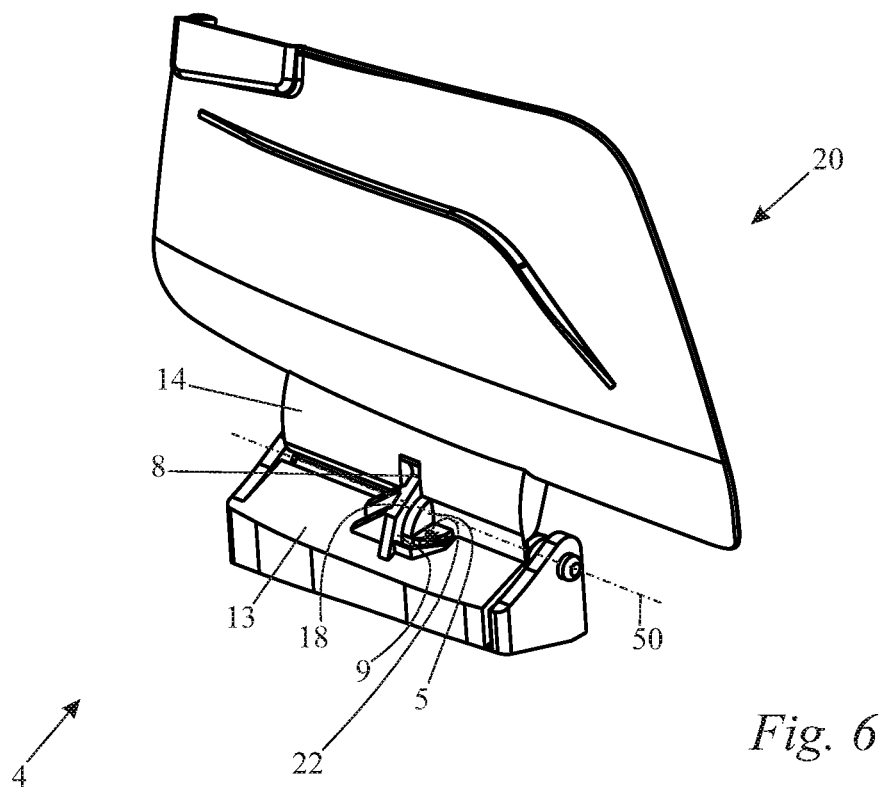
FIG. 6 is a perspective illustration of the covering device of FIG. 1 wherein the cover is in an open position.
Figure 7:
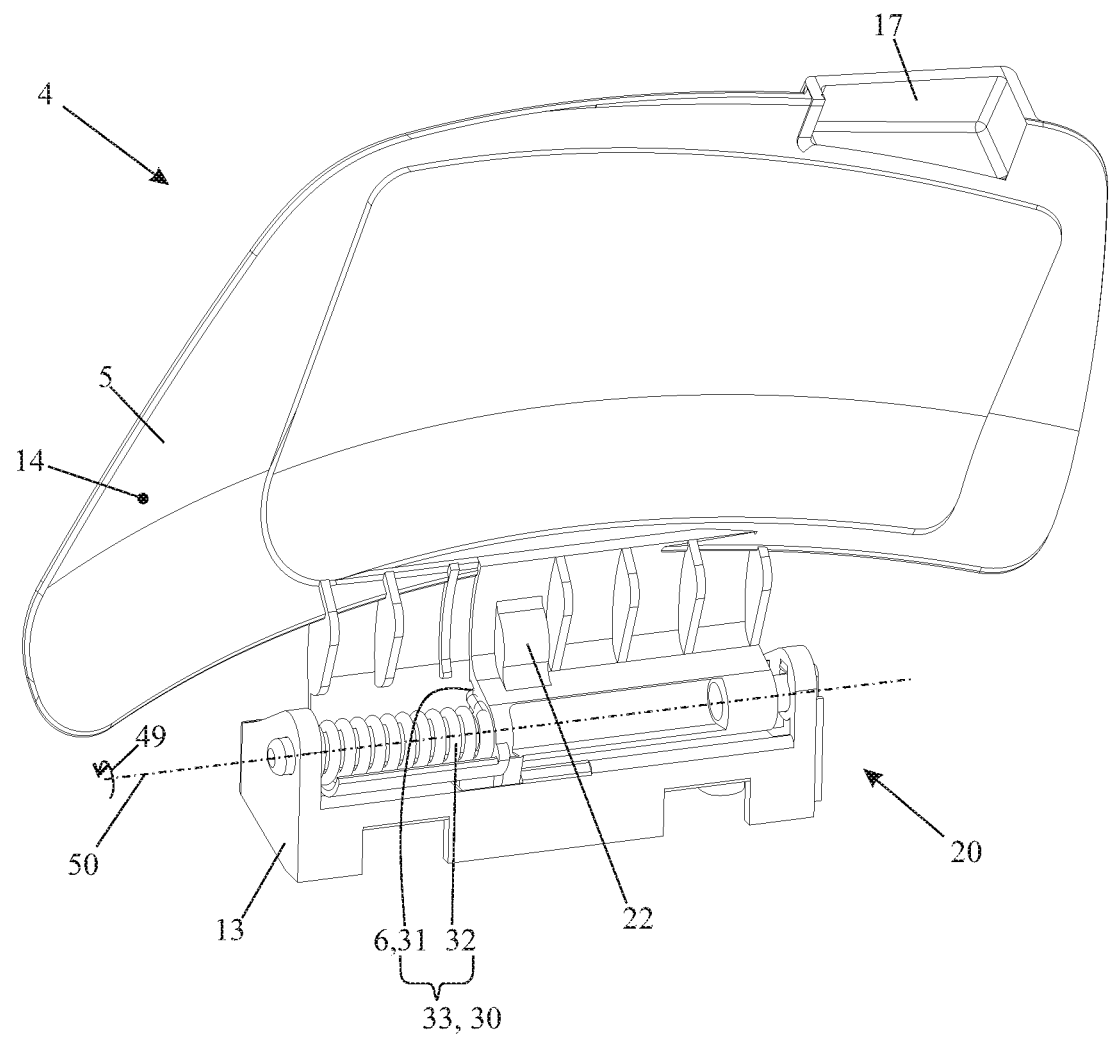
FIG. 7 is a perspective rear view of the covering device of FIG. 1 wherein the cover is in an open position.

After the cover 5 has been unlocked, the cover 5 can be pivoted from its closed state 10 in a pivot direction 49 into an open position 20 of the cover 5 that is illustrated in FIGS. 6 and 7. The pivot direction 49 extends in circumferential direction of the pivot axis 50, beginning at the closed state 10 and extending to the open position 20. The pivot direction 49 circumferentially surrounds the pivot axis 50.

As illustrated in FIG. 2, the locking device 7 comprises a first part provided at the cover 5 and a second part provided at the base member 13. In the locked position 40, the first part of the cover 5 and the second part of the base member 13 overlap in the direction of the pivot axis 50 so that the cover 5 is secured against pivoting about the pivot axis 50 in the closed state 10. In other words, the first part of the cover 5 and the second part of the base member 13 overlap in the direction perpendicular to the pivot axis 50.

The first part of the locking device 7 is embodied together with the cover 5 or a cover member 14 of the cover 5 as one piece. In the embodiment, the first part of the locking device 7 is formed by a projection 12 of the cover 5. The cover 5 comprises the cover member 14. The projection 12 of the cover 5 is secured at the cover member 14 of the cover 5. The projection 12 projects past the cover member 14 of the cover 5 in a direction that is radial to the pivot axis 50. The projection 12 has an end face 15 facing in the pivot direction 49.

The second part of the locking device 7 in the embodiment is formed by a locking edge 8 of the covering device 4. The locking edge 8 is secured at the base member 13 of the covering device 4. The locking edge 8 is embodied together with the base member 13 as one piece. The locking edge 8 comprises an end face 16 facing in a direction opposite to the pivot direction 49.

In the locked position 40, the end face 15 of the projection 12 is resting against the end face 16 of the locking edge 8. In this way, the cover 5 cannot pivot in the pivot direction 49 about the pivot axis 50. The cover 5 is locked in the locked position 40 of the closed state 10 by the locking device 7.

The locking device 7 comprises the cover 5 and the locking edge 8. For locking the cover 5, the projection 12 of the cover 5 is not absolutely necessary. Alternatively, it can also be provided that the locking edge in the form of a web overlaps the body of the cover in the locked position such that the cover in the closed state is secured against pivoting about the pivot axis. In this case, the first part of the locking device is embodied only as a partial element of the body of the cover.

As can be seen when looking at FIGS. 2 to 5 together, the cover 5 is axially movable relative to the housing 2 in the direction of the pivot axis 50. Consequently, the cover 5 is also slidable relative to the base member 13 of the covering device 4 in the direction of the pivot axis 50. By a movement of the cover 5 in the direction of the pivot axis 50, the cover 5 can be unlocked. In doing so, the cover 5 is pushed from the locked position 40 illustrated in FIGS. 2 and 3 into an unlocked position 41 illustrated in FIGS. 4 and 5. In the closed state 10, the cover 5 can be in the locked position 40 or in the unlocked position 41. The locked position 40 and the unlocked position 41 are two possible positions in the closed state 10. In the closed state 10, the cover 5 can be in the locked position 40 or in the unlocked position 41.

Starting from the unlocked position 41, the cover 5 can be pivoted in the pivot direction 49 about the pivot axis 50 into the open position 20. In the unlocked position 41, the cover 5 is unlocked.

The cover 5 is movable in the direction of the pivot axis 50 relative to the second part of the locking device 7 in such a way that the first part of the locking device 7 and the second part of the locking device 7 are without overlap relative to each other in the direction of the pivot axis 50. In the unlocked position 41, the first part of the locking device 7 and the second part of the locking device 7 are without overlap when viewed in the direction perpendicular to the pivot axis 50. In the unlocked position 41, the end face 15 of the projection 12 and the end face 16 of the locking edge 8 are without overlap relative to each other. In this way, the locking edge 8 does not impede or prevent a pivot movement of the cover 5 in the pivot direction 49. The cover 5 is unlocked in the unlocked position 41.

Figure 4:
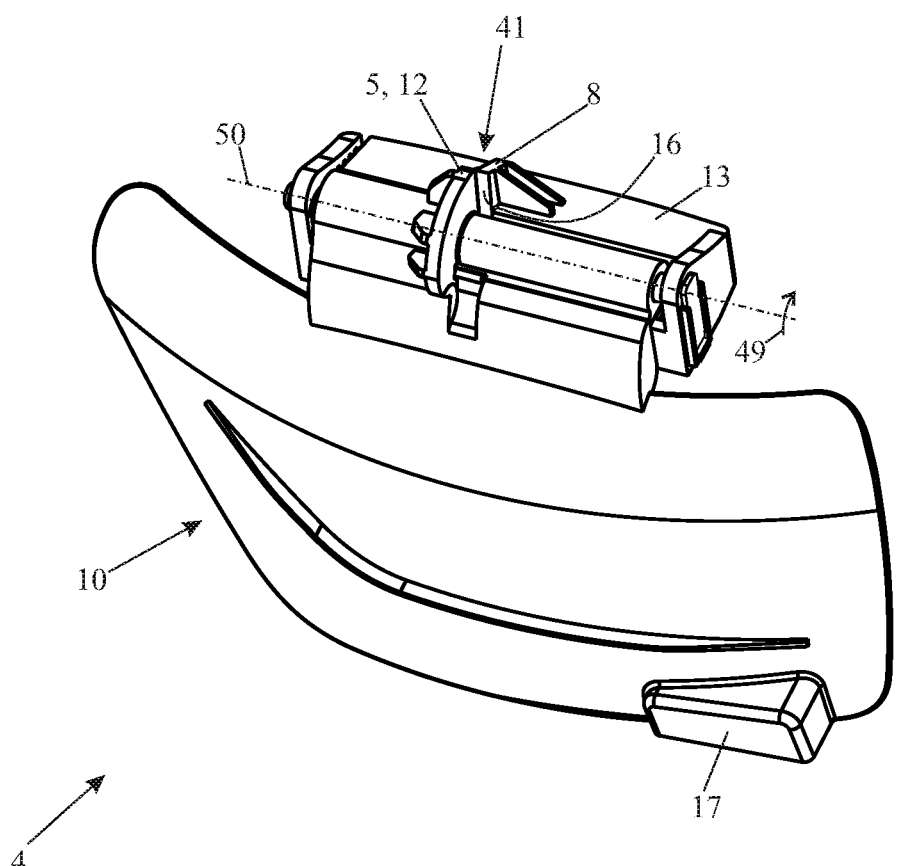
FIG. 4 is a perspective illustration of the covering device of FIG. 1 with unlocked cover.
Figure 5:
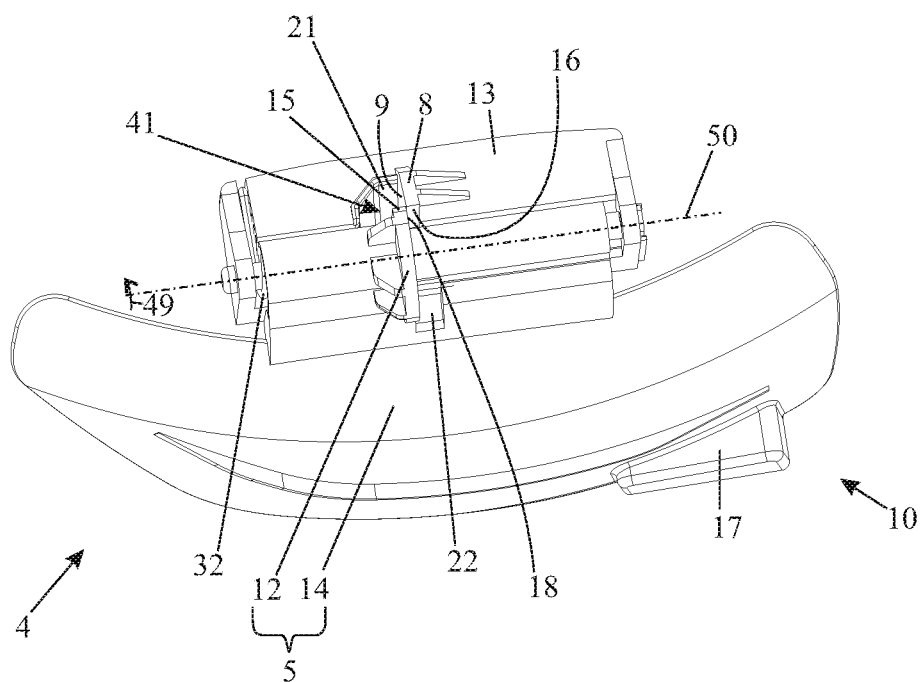
FIG. 5 is another perspective illustration of the covering device of FIG. 1 with unlocked cover.

Only from the unlocked position 41 illustrated in FIGS. 4 and 5, the cover 5 can be transferred by a pure pivoting movement of the cover 5 into the open position 20 of the cover 5 that is illustrated in FIGS. 6 and 7. In order to reach from the locked position 40 of FIGS. 2 and 3 the open position 20 of FIGS. 6 and 7, the cover 5 must first be displaced axially in the direction of the pivot axis 50 into the unlocked position 41 illustrated in FIGS. 4 and 5. Only then is it possible to pivot the cover 5 in the pivot direction 49.

As illustrated in FIGS. 2 and 3, the locking device 7 in the embodiment comprises in addition an axial spring 32. The axial spring 32 is part of the spring assembly 30 illustrated in FIG. 7. The spring assembly 30 is part of the covering device 4. The axial spring 32 illustrated in FIGS. 2 and 3 acts between the housing 2 of the lawn mower 1 and the cover 5 in the direction of the pivot axis 50. The axial spring 32 acts between base member 13 of the covering device 4 and the cover 5 in the direction of the pivot axis 50. The axial spring 32 exerts a force on the cover 5 in the direction from the unlocked position 41 toward the locked position 40 of the cover 5. It can be provided that the axial spring is a tension spring. In the embodiment, the axial spring 32 is a pressure spring. The axial spring 32 pushes the cover 5 in the direction from the unlocked position 41 toward the locked position 40. In this way, a safety mechanism is provided that ensures that the cover 5 will automatically lock in the closed state. For unlocking the cover 5, a force must be applied opposite to the force which is generated by the axial spring 32. For this purpose, the cover 5 must be moved in the direction from the locked position 42 toward the unlocked position 41 along the pivot axis 50. For this purpose, the cover 5 comprises a grip 17 which is secured at the cover member 14 of the cover 5. The grip 17 projects away from the cover member 14 of the cover 5.

From the unlocked position 41 illustrated in FIGS. 4 and 5, the cover 5 can be pivoted in the pivot direction 49 about the pivot axis 50 into the open position 20 illustrated in FIGS. 6 and 7. A contact surface 18 of the projection 12 of the cover 5, illustrated in FIGS. 5 and 6, can rest in this context against a support surface 9 of the locking edge 8 of the base member 13 illustrated also in FIGS. 5 and 6. The support surface 9 of the locking edge 8 is oriented in a first direction of the pivot axis 50. The contact surface 18 of the projection 12 is facing in the second, opposite direction of the pivot axis 50. The contact surface 18 of the projection 12 and the support surface 9 of the locking edge 8 are facing each other. The contact of the contact surface 18 at the support surface 9 in the open position 20 prevents displacement of the cover 5 in the direction of the pivot axis 50 in the direction from the unlocked position 41 into the locked position 40. The spring assembly 30 tensions the cover 5 in the open position 20 of the cover 5 against the support surface 9 of the locking edge 8. In the open position 20, the cover 5 is pushed by the axial spring 32 in the direction of the pivot axis 50 in the direction from the unlocked position 41 toward the locked position 40 against the base member 13. The projection 12 of the cover 5 is pushed against the locking edge 8 of the base member 13. Only when the cover 5 has been moved back into the closed state 10, a movement in the direction from the unlocked position 41 to the locked position 40 along the pivot axis 50 is possible. Only in the closed state 10 of the cover 5, the cover 5 can be moved into the locked position 40.

In the embodiment, the support surface 9 is embodied at least partially in a depression 21 of the base member 13 of the covering device 4. The contact surface 18 of the projection 12 is embodied partially in a depression 22 of the cover member 14 of the cover 5. Due to the depression 21, a recess in the base member 13 of the covering device 4 is formed. Due to the depression 22, a recess in the cover member 14 of the cover 5 is formed. This makes it possible that the cover 5 can be opened very wide. In the completely open state of the cover 5, illustrated in FIGS. 6 and 7, the projection 12 of the cover 5 engages the depression 21 of the base member 13 of the covering device 4. Also, the locking edge 8 of the base member 13 engages the depression 22 of the cover member 14 of the cover 5. The projection 12 is partially lowered into the depression 21. The locking edge 8 is partially lowered into the depression 22.

As illustrated in FIG. 7, the covering device 4 comprises a restoring device 6. In the open position 20, the restoring device 6 loads the cover 5 with a force in the direction toward the closed state 10. This force is acting opposite to the pivot direction 49. In this way, it is ensured that the cover 5 returns automatically from the open position 20 into the closed state 10. Due to the force which is exerted by the restoring device 6, the cover 5 is moveable continuously from the open position 20 into the closed state 10.

The restoring device 6 comprises a torsion spring 31. The torsion spring 31 is part of the spring assembly 30. The torsion spring 31 acts between the cover 5 and the housing 2. The torsion spring 31 acts between the cover 5 and the base member 13 of the covering device 4. The torsion spring 31 applies a force on the cover 5 opposite to the pivot direction 49. The force of the torsion spring 31 acts in the direction from the open position 22 toward the closed state 10. The force of the torsion spring 31 effects pivoting of the cover 5 about pivot axis 50 opposite to the pivot direction 49.

When the cover 5 is in the completely open state and is not held in this state, for example, by means of the discharge chute, the cover 5 is first moved by the restoring device 6 into the unlocked position 41 of the closed state 10 and subsequently moved by the axial spring 32 of the locking device 7 from the unlocked position 41 into the locked position 40 of the closed state 10. In this way, it is ensured that the cover 5 returns always automatically from the open position 20 into the locked position 40. In this way, the cover 5 is safely locked. In order to open the cover 5, it must be moved first axially in the direction of the pivot axis 50 and unlocked; subsequently, it must be pivoted in the pivot direction 49 into the open position 20.

In the embodiment, the spring assembly 30 illustrated in FIG. 7 is a combined axial and torsion spring 33. The combined axial and torsion spring 33 comprises the torsion spring 31 and the axial spring 32. The combined axial and torsion spring 33 is part of the restoring device 6 as well as part of the locking device 7. The combined axial and torsion spring 33 is a combined pressure and torsion spring.

The specification incorporates by reference the entire disclosure of European priority document 19 175 188.2 having a filing date of May 17, 2019.

While specific embodiments of the invention have been shown and described in detail to illustrate the inventive principles, it will be understood that the invention may be embodied otherwise without departing from such principles.

What is claimed is:

1. A lawn mower comprising:
a housing comprising a discharge opening configured to discharge cut material;
a covering device arranged at the housing, wherein the covering device comprises a cover and a locking device;
wherein the cover is configured to pivot about a pivot axis;
wherein the cover is configured to cover the discharge opening in a closed state of the cover and to open the discharge opening in an open position of the cover;
wherein, in the closed state of the cover, the cover is configured to be locked by the locking device in a locked position of the cover;
wherein the cover is configured to move relative to the housing in a direction of the pivot axis and wherein the cover is configured to be unlocked from the locked position of the cover by a movement of the cover in the direction of the pivot axis;
wherein the locking device comprises a first part arranged at the cover, wherein the locking device comprises a second part secured at the housing, wherein, in the closed state of the cover, the first part and the second part of the locking device overlap each other in the direction of the pivot axis in the locked position of the cover such that the cover is secured against pivoting about the pivot axis in the locked position of the cover.

2. The lawn mower according to claim 1, wherein the covering device comprises a restoring device, wherein the restoring device is configured to load the cover in the open position of the cover by a force acting in a direction toward the closed state of the cover.

3. The lawn mower according to claim 2, wherein the cover is moveable continuously from the open position of the cover into the closed state of the cover by the force exerted by the restoring device.

4. The lawn mower according to claim 2, wherein the covering device comprises a spring assembly.

5. The lawn mower according to claim 4, wherein the spring assembly comprises a torsion spring and wherein the torsion spring is a part of the restoring device.

6. The lawn mower according to claim 1, wherein the cover is configured to be moveable in the direction of the pivot axis relative to the second part of the locking device such that the first part of the locking device and the second part of the locking device do not overlap in the direction of the pivot axis.

7. The lawn mower according to claim 1, wherein the first part of the locking device and the cover are embodied together as one piece.

8. The lawn mower according to claim 1, wherein the covering device comprises a base member configured to secure the covering device at the housing, wherein the base member is non-slidably connected to the housing, and wherein the second part of the locking device is formed by a locking edge secured at the base member.

9. The lawn mower according to claim 8, wherein, in the direction of the pivot axis, the locking edge comprises a support surface and wherein the spring assembly pretensions the cover against the support surface of the locking edge in the open position of the cover.

10. A lawn mower comprising:
a housing comprising a discharge opening configured to discharge cut material;
a covering device arranged at the housing, wherein the covering device comprises a cover and a locking device;
wherein the cover is configured to pivot about a pivot axis;
wherein the cover is configured to cover the discharge opening in a closed state of the cover and to open the discharge opening in an open position of the cover;
wherein, in the closed state of the cover, the cover is configured to be locked by the locking device in a locked position of the cover;
wherein the cover is configured to move relative to the housing in a direction of the pivot axis and wherein the cover is configured to be unlocked from the locked position of the cover by a movement of the cover in the direction of the pivot axis;
wherein the covering device comprises a restoring device, wherein the restoring device is configured to load the cover in the open position of the cover by a force acting in a direction toward the closed state of the cover;
wherein the covering device comprises a spring assembly;
wherein the spring assembly comprises an axial spring, wherein the axial spring is a part of the locking device, and wherein the axial spring acts between the housing and the cover in the direction of the pivot axis.

11. The lawn mower according to claim 10, wherein the axial spring is a pressure spring.

12. A lawn mower comprising:
a housing comprising a discharge opening configured to discharge cut material;
a covering device arranged at the housing, wherein the covering device comprises a cover and a locking device;
wherein the cover is configured to pivot about a pivot axis;
wherein the cover is configured to cover the discharge opening in a closed state of the cover and to open the discharge opening in an open position of the cover;
wherein, in the closed state of the cover, the cover is configured to be locked by the locking device in a locked position of the cover;
wherein the cover is configured to move relative to the housing in a direction of the pivot axis and wherein the cover is configured to be unlocked from the locked position of the cover by a movement of the cover in the direction of the pivot axis;
wherein the covering device comprises a restoring device, wherein the restoring device is configured to load the cover in the open position of the cover by a force acting in a direction toward the closed state of the cover;
wherein the covering device comprises a spring assembly;
wherein the spring assembly is a combined axial and torsion spring, and wherein the combined axial and torsion spring is a part of the restoring device and a part of the locking device.

* * * * *